INVENTOR:
Adelbert C. Herstedt
By Smyth & Roston
Attorneys

Jan. 16, 1962
A. C. HERSTEDT
3,017,521
TRANSISTOR CIRCUIT FOR PRODUCING A PULSE OUTPUT FOR EACH INPUT SIGNAL PEAK
Filed July 1, 1958
2 Sheets-Sheet 2

INVENTOR:
Adelbert C. Herstedt
By Smyth & Roston
Attorneys

United States Patent Office 3,017,521

Patented Jan. 16, 1962

3,017,521

TRANSISTOR CIRCUIT FOR PRODUCING A PULSE OUTPUT FOR EACH INPUT SIGNAL PEAK

Adelbert C. Herstedt, Los Angeles, Calif., assignor to The Magnavox Company, Los Angeles, Calif., a corporation of Delaware Filed July 1, 1958, Ser. No. 745,880
13 Claims. (Cl. 307—88.5)

The present invention relates to peak detector circuits. The invention relates more particularly to an improved type of peak detector which incorporates transistors and in which the unique characteristics of transistors are used to provide output signals indicating the peaks of input signals introduced to the circuit.

The peak detector circuit of the invention is constructed to produce a sharp output pulse each time an input signal reaches a peak. The circuit may be constructed so that an output pulse is obtained at one output terminal for each peak of the input signal on one side of its reference axis, and so that an output pulse is obtained at a second output terminal for each peak of the input signal on the other side of its reference axis.

Peak detectors of the general type referred to above find wide utility in electronic circuits and systems. For example, in present day digital computors and data processing systems it is usual to provide a series of clock pulses to time the different operations in the equipment. These clock signals are usually recorded on a magnetic memory and are read by an electromagnetic read head. The resulting output signal from the read head usually has a configuration similar to a distorted sine wave and is inappropriate for precise gating and timing applications.

The use of the peak detector of the invention in conjunction with the clock output signal of the read head referred to in the preceding paragraph causes a series of precisely timed sharp pulses to be developed when the clock signal is read, and these pulses are ideal for precise gating and timing purposes. The sharp pulses derived from the peak detector circuit in each instance coincide in time with a corresponding peak of the clock signal.

Self clocking is often desirable in equipment such as that referred to above. This technique enables the actual binary data stored in the magnetic memory to provide its own timing signals. This is especially advantageous, for example, in equipment using magnetic tape where skewing of the tape can produce timing errors when independent clock signals on the tape are used for timing purposes. As will be described, the peak detector of the invention is especially suited for use in self clocking systems, and the detector is capable of responding to the stored binary data itself to produce precisely timed clocking pulses.

The peak detector of the embodiment of the invention to be described includes a pair of transistors, one of the positive-negative-positive (p-n-p) conductivity type and one of the negative-positive-negative (n-p-n) conductivity type. The emitters of the transistors are connected together and to a capacitor which, in turn, is connected to a point of reference potential. The collector of the p-n-p transistor is connected to the negative terminal of a direct voltage source and the collector of the n-p-n transistor is connected to the positive terminal of the direct voltage source. An input signal is introduced between the bases of the transistors and the point of reference potential. Separate transformers regeneratively intercouple the collectors and bases of the respective transistors.

As the input signal increases in amplitude, for example, on the positive side of its zero axis, the n-p-n transistor becomes conductive and current flows from its base to its emitter to charge the capacitor. At this time, the p-n-p transistor is non-conductive. The conductivity of the n-p-n transistor causes current to flow in its collector circuit and through a diode which is shunted across the primary of the transformer to effectively bypass the primary for current flow in this direction.

This current flow through the n-p-n transistor continues until the input signal reaches a positive peak. The accumulated charge on the capacitor causes the emitter bias to follow the instantaneous potential of the base. The emitter bias follows the base since any potential on the base greater than the potential on the emitter would tend to cut off the transistor. Therefore, when the input signal reaches a positive peak and starts to decline, there is a tendency for the n-p-n transistor to become non-conductive. The reason is that the accumulated charge in the capacitor causes the potential on the emitter of the transistor to exceed the potential on the base of the transistor. The resulting drop in collector current causes a reverse current flow through the primary of the transformer and this reverse current causes the secondary to introduce a voltage to the base of the n-p-n transistor of a polarity to render the particular transistor non-conductive. This causes a sharp pulse to be produced across the secondary and in a tertiary output winding of the transformer. Therefore, a sharp output pulse is produced for each positive peak of the input signal.

When the input signal returns to its zero axis and begins to increase in amplitude on the negative side of its axis, the p-n-p transistor now begins to conduct and the n-p-n transistor is non-conductive. A similar action occurs, with the resulting current flow through the p-n-p transistor producing a negative charge on the capacitor. The capacitor therefore biases the emitter of the p-n-p transistor in a manner to follow the instantaneous potential on its base. Again, when the input signal reaches a negative peak, a sharp regenerative pulse is produced as the p-n-p transistor is driven to cut off, and this pulse is picked up by a tertiary winding, for example, associated with the second transformer. Therefore, the peak detector of the invention is also capable of producing an output pulse for each negative peak of the input signal.

The circuit, therefore, has the feature of producing sharp pulses in time coincidence with the peaks of the input signal. Other features and advantages of the invention will become evident from the following description when taken in conjunction with the accompanying drawings in which.

Figure 1:
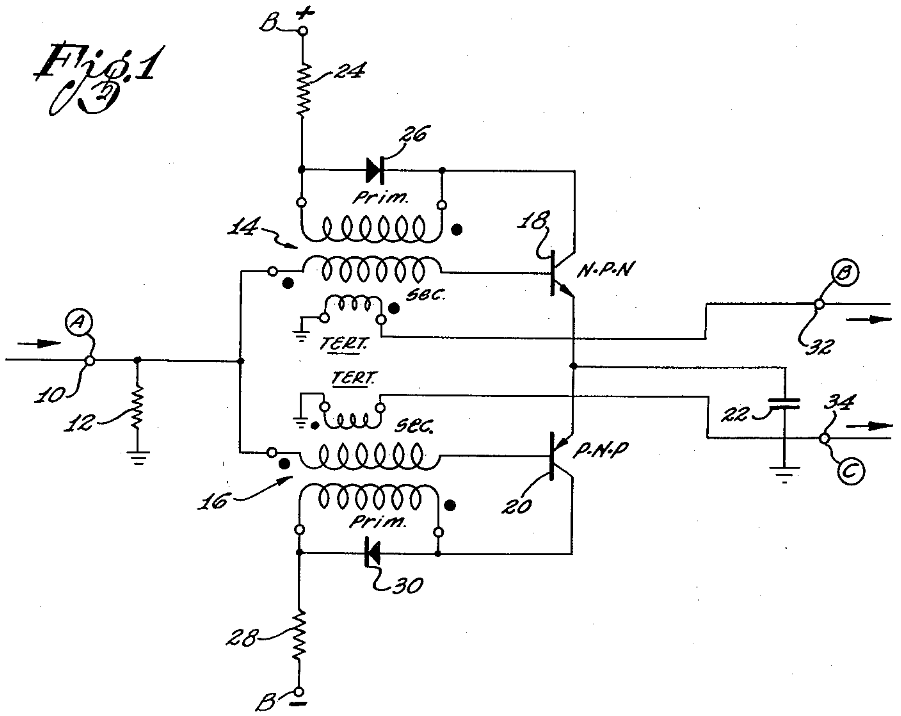
FIGURE 1 is a circuit diagram of one embodiment of the improved peak detector circuit of the invention.

The peak detector circuit of FIGURE 1 includes an input terminal 10. This terminal is connected to a grounded resistor 12, and the terminal is also connected to the secondary winding of a transformer 14 and the secondary winding of a transformer 16. The resistor 12, for example, may have a resistance of 620 ohms. The transformers 14 and 16 may be of the type manufactured by the Pulse Engineering Company and designated by them as model EF71–2248. These transformers are of usual construction and have a 4:1 primary-to-secondary turns ratio, with the primary having an inductance of 2.5 millihenrys.

The other terminal of the secondary of the transformer 14 is connected to the base of a semi-conductor such as a transistor 18, and the other terminal of the secondary of the transformer 16 is connected to the base of a semi-conductor such as a transistor 20. In view of this, it will be understood that the term "transistor" as used in the claims is intended to include any type of semiconductors suitable for use in place of the transistors. It will also be understood that the base of the transistors 18 and 20 can be considered as "input" electrodes.

The transistor 18 may be of the negative-positive-negative (n-p-n) conductivity type, and it may be a Germanium switching transistor manufactured by the General Transistor Company and designated by them as type GT947. The transistor 20, on the other hand, may be of the positive-negative-positive (p-n-p) conductivity type and may be of the type manufactured by the General Transistor Company and designated 2N317. The latter transistor is also a usual germanium switching transistor.

The emitters of the transistors 18 and 20 are connected to a grounded capacitor 22, which may have a value of .033 microfarad. Because of their common connection, the emitters of the transistors 18 and 20 may be considered as "common" electrodes. The collector of the transistor 18 is connected to one terminal of the primary of the transformer 14, the other terminal of the primary being connected to a resistor 24. The collector of the transistor 18 may be considered as an "output" electrode, as will become fully apparent subsequently. The resistor 24 has a resistor of 820 ohms, for example, and is connected to the positive terminal of a direct voltage exciting source "B." The primary winding of the transformer 14 is shunted by an asymmetrically conductive device such as a diode 26. This diode 26 may be a unidirectional member such as a germanium high-conductance diode, which may be a T7G Tranistron. The diode 26 is connected so as to constitute a path which by-passes the primary of the transformer 14 for the collector current flow through the transistor 18. The diode may, when so desired, be connected to shunt the secondary of the transformer rather than the primary.

The collector (or "output" electrode) of the transistor 20 is connected to one terminal of the primary winding of the transformer 16. The other terminal of this latter primary winding is connected to a resistor 28 which, in turn, is connected to the negative terminal of the direct-voltage exciting source "B." The prime purpose of the resistors 24 and 28 is to keep the transistors 26 and 30 within their power ratings. These resistors do have a limiting effect on the upper frequency response of the circuit, and they may be eliminated if so desired.

The resistor 28 also has a resistance of 820 ohms, for example, and the primary of the transformer 16 is shunted by an asymmetrically conductive device such as a diode 30, and this latter device may also be a unidirectional conductive member such as a high conductance germanium diode, which may be a T7G Transitron. The diode 30 is connected with a polarity to effectively short circuit the primary of the transformer 16 for the collector current flow of the transistor 20. For this purpose, the anode of the diode 30 is connected to the collector of the transistor 20, and the cathode of the diode is connected to the resistor 28. For the same reason, the cathode of the diode 26 is connected to the collector of the transistor 18 and the anode of the diode 26 is connected to the resistor 24. This diode 30, likewise, may be connected to shunt the secondary of the transformer 16 rather than the primary.

The transformer 14 has a tertiary winding which has one terminal grounded and which has its other terminal connected to an output terminal 32. The transformer 16 also has a tertiary winding which has one terminal grounded and the other terminal of the latter tertiary winding is connected to an output terminal 34 of the circuit.

The relative polarities of the signals across the different windings of the transformer 14, and of the transformer 16, are indicated by dots in accordance with the usual convention.

Figure 2:
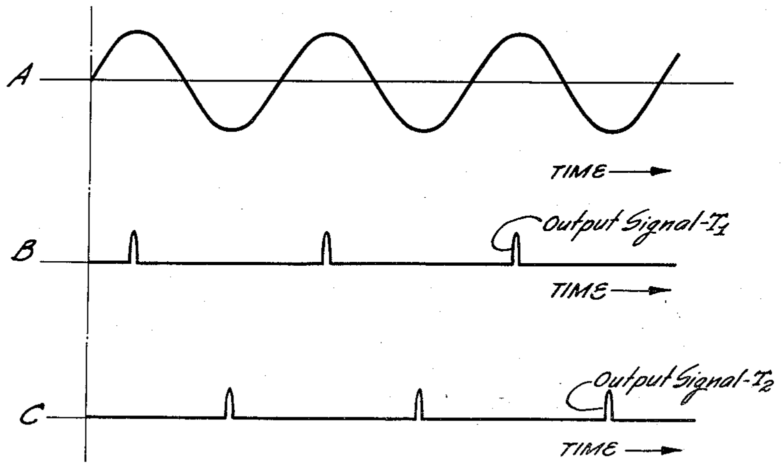
FIGURE 2 is a series of curves useful in explaining the operation of the circuit of FIGURE 1.

An input signal designated A in FIGURE 1, and which is shown in the curve A of FIGURE 2, may be introduced to the input terminal 10. This input signal, for example, may be a 30 kilocycle sine wave having a peak-to-peak amplitude of 2 to 6 volts. When the input signal is increasing in amplitude on the positive side of its zero or reference axis, the resulting positive voltage across the resistor 12 causes the base of the transistor 18 to swing positive with respect to its emitter so that a current flows in that transistor. The base of the transistor 20 is also caused to swing positive with respect to its emitter. However, this causes the latter transistor to be non-conductive because it is of the p-n-p type.

As emitter current flows through the transistor 18, a charge is accumulated on the capacitor 22. This charge biases the emitter of the transistor 18 and causes the emitter to follow the instantaneous voltage on the base. The resulting collector current flow flows through the diode 26, and an insignificant current flows in the primary of the transformer 14 and a negligible voltage is developed across the secondary of that transformer. The current flowing through the transistor 18 and the capacitor 22 charges the capacitor only sufficiently to have the potential on the emitter of the transistor follow the potential on the base of the transistor. The reason is that any increased charge in the capacitor 22 would tend to raise the potential on the emitter of the transistor 18 above the potential on the base of the transistor so that the transistor would tend to become cut off.

When the input signal reaches a positive peak, the charge on the capacitor 22 holds the emitter bias at approximately the peak value. However, the potential on the base of the transistor now starts to decline, as may be seen from the curve "A" of FIGURE 2. This causes the conductivity of the transistor 18 to decrease. The resulting collapse of current through the transistor causes a current to flow in the primary of the transformer 14 in the collector circuit. This current causes a voltage to be induced across the secondary of the transformer 14, the induced voltage having a polarity to drive the transistor rapidly to the non-conductive state. This accumulative action produces a sharp pulse across the tertiary winding of the transformer 14, and that pulse coincides in time precisely to the positive peak of the input signal. The output pulse appears at the terminal 32. These output pulses are designated as "B" in FIGURE 1, and they are shown in the curve "B" of FIGURE 2.

Now, as the input signal "A" returns to its zero axis, the p-n-p transistor 20 begins to conduct as the instantaneous voltage introduced to its base falls below the charge on the capacitor 22. Again, the capacitor 22 causes the bias on the emitter on the transistor 20 to follow the instantaneous voltage on the base of the transistor. The conduction of the transistor 20 continues as the input signal swings below the zero axis and increases in the negative direction. When the input signal reaches its negative peak, the conduction through the transistor 20 drops to zero. This causes a current reversal in the collector circuit and through the primary of the transformer 16. This, in turn, causes the secondary of the transformer 16 to introduce a voltage to the base of the transistor 20 of a polarity to render that transistor rapidly non-conductive. A resulting sharp pulse is produced across the tertiary winding of the transformer 16 and at the output terminal 34. These latter pulses are designated "C" in FIGURE 1, and they are shown in the curve "C" in FIGURE 2. It will be observed that the sharp pulses of the curve "C" occur in time coincidence with the negative peaks of the input signal of the curve "A."

Therefore, the peak detector circuit of FIGURE 1 is capable of producing a series of sharp pulses at its first output terminal 32 in response to an input signal introduced to its input terminal 10. These sharp pulses coincide to the positive peaks of the input signal. The peak detector circuit also produces at its second output terminal 34 a series of sharp pulses which coincide to the negative peaks of the input signal.

The circuit is extremely simple in its construction and reliably operates to produce the desired output pulses.

Figures 3, 4:
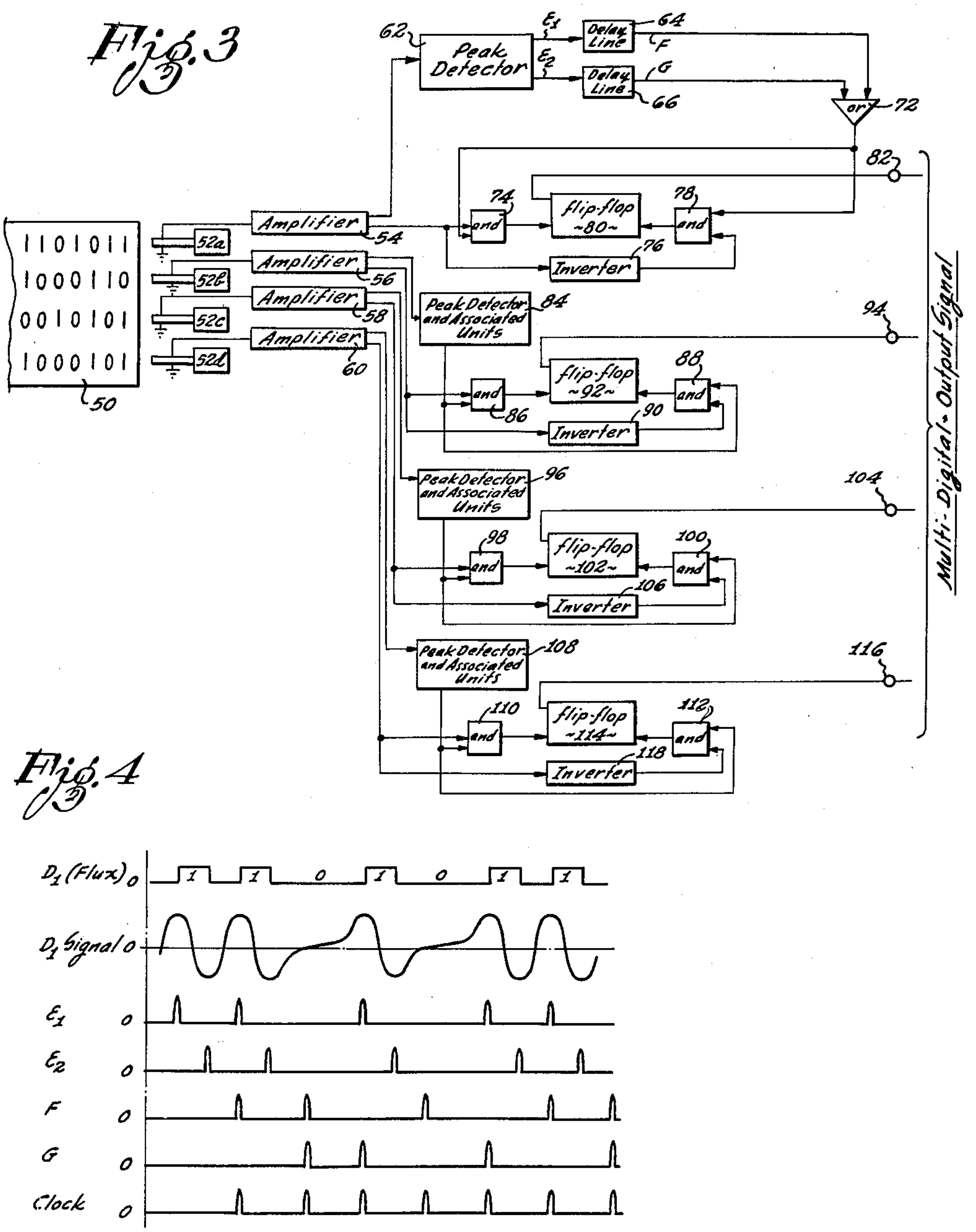
FIGURE 3 is a block diagram of a card processing system, this system being utilized to read digital data which is stored on each of a plurality of separate cards and which utilizes the peak detector of the present invention for self clocking purposes.
FIGURE 4 is a series of curves useful in explaining the operation of the system of FIGURE 3.

As noted above, one particular use for the peak detector of the invention is for clock pulsing in certain electronic equipment. Such an application is shown in FIGURE 3 in which the peak detector is incorporated in a card processing system for self-clocking purposes. The card processing system of FIGURE 3 may be similar to the systems described, for example, in copending applications 529,886 filed August 22, 1955, and 540,826 filed October 17, 1955.

These card processing systems utilize a plurality of information storage cards such as the card 50 of FIGURE 3. The card 50 contains rows and columns of magnetic dots of a selected magnetic polarity; and the presence of such a dot in a digit position represents a binary one, while the absence of such a dot in a digit position represents a binary zero. The dots are arranged to represent successive multi-digit numbers. As fully described in the copending applications, the cards such as the card 50 are successively carried from station to station on a suitable transport medium past groups of electromagnetic transducer heads, such as the heads **52*a*, 52*b*, 52*c* and 52*d*** of FIGURE 3. These heads are arranged to process adjacent rows of data on the cards, as they are carried past the transducer station. Therefore, a plurality of rows of data are simultaneously read by the heads for each position of each card. This provides a parallel read-out for the multi-digit number represented by the binary data at each such position.

The transducer head **52*a* is connected to an amplifier 54; the head 52*b* is connected to an amplifier 56; the head 52*c* is connected to an amplifier 58; and the head 52*d* is connected to an amplifier 60**.

The amplifier 54 is connected to a peak detector 62 which may be constructed in the manner described in conjunction with FIGURE 1. The peak detector 62 has a first output terminal which is connected to a delay line 64 and at which a short pulse appears in time coincidence with each positive peak of the input signal. The peak detector has a second output terminal which is connected to a delay line 66 and at which a sharp pulse appears for each negative peak of the input signal derived from the amplifier 54.

The output terminal of the delay line 64 is connected to an "or" network 72. The output terminal of the delay line 66 is connected to a second input terminal of the "or" network 72.

"Or" networks such as the network 72 are well known to the electronic computer art. These networks include transistors or diodes and serve to translate an input signal introduced to any of its mutually isolated input terminals to a common output terminal.

The amplifier 54 is connected to and "and" network 74 and to an inverter 76. The output terminal of the inverter is connected to an "and" network 78. The "or" network 72 is connected to second input terminals of the "and" networks 74 and 78. The "and" network 74 is connected to the left input terminal of a flip-flop 80, and the "and" network 78 is connected to the right input terminal of the flip-flop. The left output terminal of the flip-flop 80 is connected to an output terminal 82.

"And" networks such as the networks 74 and 78 are also well known to the digital computer art. These networks serve to translate a signal to the output terminal only when input signals are simultaneously applied to all the input terminals. The inverter 76 may be a usual circuit for inverting the phase or polarity of the signal introduced to it. Flip-flops, such as the flip-flop 80 are also well known to the art. The flip-flop is a bistable relaxation oscillator, and it may be triggered to a first stable state upon the introduction of an input signal to its left input terminal and to a second stable state by the introduction of an input signal to its right input terminal.

The flip-flop 80, for example, is triggered to a true state by the introduction of a negative signal to its left input terminal, and the flip-flop is triggered to a false state upon the introduction of a negative signal to its right input terminal. When the flip-flop 80 is in a true state, a negative voltage appears at its left output terminal and at the output terminal 82.

The amplifier 56 is connected to a unit designated 84. This unit includes a peak detector such as the peak detector 62, a pair of delay lines such as the delay lines 64 and 66, and an "or" network such as the "or" network 72. The unit 84 supplies output signals to a pair of "and" networks 86 and 88. The amplifier 56 is connected to the "and" network 86 and to the input terminal of an inverter 90. The output terminal of the inverter is connected to the "and" network 88. The "and" network 86 is connected to the left input terminal of a flip-flop 92, and the "and" network 88 is connected to the right input terminal of the flip-flop. The left output terminal of the flip-flop 92 is connected to an output terminal 94.

The amplifier 58 is connected to a block 96. This latter block contains a peak detector and associated units, similar to block 84. The block 96 is connected to an "and" network 98 and to an "and" network 100. The "and" network 98 is connected to the left input terminal of a flip-flop 102, and the "and" network 100 is connected to the right input terminal of that flip-flop. The left output terminal of the flip-flop 102 is connected to an output terminal 104. The amplifier 58 is also connected to the "and" network 98 and to an inverter 106, the inverter being connected to the "and" network 100.

The amplifier 60 is connected to a block 108 which contains the same type of units as the blocks 84 and 96. The block 108 is connected to an "and" network 110 and to an "and" network 112. The "and" network 110 is connected to the left input terminal of a flip-flop 114, and the "and" network 112 is connected to the right input terminal of that flip-flop. The left output terminal of the flip-flop 114 is connected to an output terminal 116. The amplifier 60 is also connected to the "and" network 110 and to an inverter 118, the inverter being connected to a second input terminal of the "and" network 112.

As the information storage cards 50 are transported past the heads **52*a*, 52*b*, 52*c* and 52*d*, these heads read different rows of binary data on each card, and as mentioned above, the heads simultaneously read a column of such binary digits to provide a parallel read-out of a multi-digit binary number corresponding to each position on the card. When such a number is read, the corresponding magnetic dots are transformed to electrical signals, and these electrical signals are amplified by the amplifiers 54, 56, 58 and 60**.

Should a binary "1" be read by the head **52*a* in the first row, the flip-flop 80 is triggered to a true state so that the potential at the output terminal 82 becomes a negative voltage to represent a binary "1." Likewise, should a binary "0" be read in the second row of the head 52*b*, the flip-flop 92 is triggered to a false state so that the potential at the terminal 94 remains at zero voltage to represent a binary "0." In like manner, the reading of the magnetic dots by the heads 52*c* and 52*d* determines the states of the flip-flops 112 and 114, and the respective voltage levels of the output terminals 104** and 116. In this manner, a series of output signals appears across the output terminals 82, 94, 104 and 116, with the output signals representing a different multi-digit number for each position of each card as it is processed by the heads *52a*—*52d*. These multi-digit numbers may be used in any of a variety of ways for data processing, or for other operations well known to the computer and data processing art.

The triggering of the flip-flops in most data processing systems is timed by clock pulses to assure that the flip-flops will be triggered at properly timed intervals with respect to one another. As noted above, this clocking may be of the self-clocking type in accordance with the data itself, as is the case with the system of FIGURE 3.

In FIGURE 4, the curve D1 (flux) represents a flux pattern passing the read head *52a* as the illustrated card 50 is processed by the heads, and as the head *52a* reads the top row of data of that card. As shown in FIGURE 4, the flux pattern rises to a maximum for each binary "1," and remain at zero for each binary "0." As the flux pattern moves past the read head *52a*, the read head provides an output signal designated by the curve D1 (signal). This latter curve has a distorted sine wave configuration. It will be observed that the signal curve rises to a maximum positive peak for each leading edge of the flux wave and drops to a negative peak for each trailing edge of the flux wave.

When the signal D1 is passed through the peak detector 62, the peak detector introduces the series of pulses shown by the curve $E_1$ to the delay line 64 and it introduces the series of pulses shown by the curve $E_2$ to the delay line 66. The curve $E_1$ comprises a series of sharp pulses which coincide in time to each positive peak of the signal from the amplifier 54. The curve $E_2$, on the other hand, comprises a series of pulses which coincide in time to each negative peak of the signal from the amplifier. The pulses of the curves $E_1$ and $E_2$ are produced by the peak detector 62 in a manner similar to operations described in conjunction with the circuit of FIGURE 1.

The pulses of the curve $E_1$ are delayed by the delay line 64 so that the output pulses from the delay line, as shown by the curve F, occur at times corresponding to the beginning of the next succeeding digit time. The pulses $E_2$ are delayed by the delay line 66 by a greater amount, so that the output pulses of this latter delay line, as shown by the curve G, appear at the beginning of the digit time following the next succeeding digit time.

The pulses from the curve F are passed through the "or" network 72 to the "and" networks 74 and 78 so that the "and" network may be conditioned to translate at times dictated by these pulses. The pulses passing through the "or" network 72 represent the clock pulses, as may be seen in the last curve of FIGURE 4.

The output signal from the amplifier 54 is applied to the "and" network 74, so that a binary "1" designation for which the output signal is positive will cause the flip-flop 80 to be triggered to a true state. This triggering occurs, of course, at the moment that the "and" network is rendered conductive by a pulse from the "or" network 72. The output signal from the amplifier 54 is also introduced to the inverter 76, so that a binary "0" designation at which the output signal is zero will produce a positive signal at the output of the inverter. This latter output signal is introduced to the "and" network 78, and it causes the flip-flop 80 to be triggered to a false state at the moment the "and" network 78 is rendered conductive by a pulse from the "or" network 72.

In the manner described in the preceding paragraph, the output pulses from the "or" network 72 serve to clock the triggering of the flip-flop 80. These output pulses are shown by the curve "clock" of FIGURE 4. It will be noted that each of these pulses is made to occur at the beginning of the corresponding digit time so that the flip-flop will be triggered precisely at that moment. The derivation of the clock pulses from the negative peaks of the signal of the curve D–1 as well as from the positive peaks assures that a clock pulse will be present for each binary "0" which follows a binary "1" designation of that signal and for which the signal has zero amplitude. It will be understood that clock pulses may be lost when a series of binary "0's" are successively represented. However, this is not important because there is no triggering of the flip-flop 80 except when the binary digit represented at any particular moment is different from the preceding digit.

In like manner, the output pulses from the units 84, 96 and 108 are used to clock the triggering of the flip-flops 92, 102 and 114. This causes all the flip-flops to be properly controlled and timed so that the triggering of these flip-flops occurs at precisely the beginning of a digit time. It will be noted that this clocking of the flip-flops is in accordance with pulses derived from the actual data recorded on the card, and not from a separately recorded series of clock pulses.

The system of FIGURE 3, of course, represents only one possible use for the peak detector circuit of the present invention. It will be understood by those skilled in the art that the peak detector circuit is capable of a wide variety of other uses in the electronic art.

The invention provides, therefore, an improved and simplified transistor circuit in which the unique characteristics of transistor elements are used to provide an output signal indicative of the peaks of an introduced input signal. The circuit of the invention may be constructed to produce pulses corresponding to either the positive or negative peaks of the input signal, or to both these peaks. The detector circuit of the invention is advantageous in that it is reliable in its operation, and yet it is simple and economical to construct.

I claim:

1. In combination for use with a reference potential for operating upon an input signal having an amplitude progressively increasing to a peak value and progressively decreasing from the peak value to produce pulses of short amplitude relative to the input signal and at peak amplitudes during the introduction of the input signal: a semi-conductor; capacitor means coupled electrically to the semi-conductor; input circuit means coupled electrically to the semi-conductor and responsive to the input signal for producing a current flow through the semi-conductor to produce a charge on the capacitor and a bias on the semi-conductor in accordance with the amplitude at each instant of the input signal for an instantaneous decrease in the flow of current through the semi-conductor at the instant that the input signal reaches a peak amplitude, and means coupled to the semi-conductor and responsive to the instantaneous decrease in the flow of current through the semi-conductor for producing the output pulse at the instant of such decrease in the flow of current through the semi-conductor.

2. In combination for use with a reference potential for operating upon an input signal having an amplitude progressively increasing to a peak value and progressively decreasing from the peak value to produce pulses of short duration relative to the input signal and at peak amplitudes during the introduction of the input signals: a transistor having an input electrode, an output electrode and a common electrode; capacitor means connected between the common electrode and the reference potential; input circuit means connected between the input electrode and the reference potential and responsive to the input signal for producing a current flow through the transistor to produce a charge on the capacitor and a bias on the common electrode relative to the input electrode of the transistor in accordance with the instantaneous amplitude of the input signal during an increase in the amplitude of the input signal and to produce an instantaneous decrease in the flow of current through the transistor at the instant that the amplitude of the input signal starts to decrease; and means in circuit with the output electrode for producing the output pulse at the instant of such decrease in the flow of current through the transistor.

3. In combination for use with a reference potential for operating upon an input signal having an amplitude progressively increasing to a peak value and progressively decreasing from the peak value to produce pulses of short duration relative to the input signal and at peak amplitudes during the introduction of the input signal: a transistor having an input electrode, an output electrode and a common electrode; capacitor means connected between the common electrode of the transistor and the reference potential; input circuit means connected between the input electrode and the reference potential and responsive to the input signal for producing a current flow through the transistor to produce an increase in the charge on the capacitor in accordance with increases in the amplitude of the input signal and to provide a bias on the common terminal of the transistor relative to the input terminal of the transistor for producing a decrease in the flow of current through the transistor upon decreases in the amplitude of the input signal; first inductance means connected to the output electrode of the transistor; second inductance means magnetically coupled to the first inductance means and coupled electrically to the input circuit and the input electrode, said first and second inductance means being connected and being magnetically poled relative to each other to cause a voltage to be introduced to the input electrode at the instant of such crop in the conduction of the transistor and said voltage having a polarity and characteristics to drive said transistor instantaneously to a non-conductive state; and third inductance means coupled magnetically to the first and second inductance means for producing the output pulse at the instant of such driving of the transistor to a non-conductive state.

4. The combination defined in claim 3 in which a voltage source is provided and in which said first inductance means is included in a circuit interposed between said output electrode and the voltage source, and in which unidirectional conducting means are connected in shunt with the first inductance means effectively to by-pass said first inductance means during the transistor current flow resulting from increases in the amplitude of the input signal.

5. In combination for use with a reference potential for operating upon an input signal having an amplitude progressively increasing to a peak value and progressively decreasing from the peak value to produce pulses of short duration relative to the input signal and at peak amplitudes during the introduction of the input signal: a transistor having a base, a collector and an emitter; capacitor means connected between the emitter and the reference potential; input circuit means connected between the base and the reference potential and responsive to the input signal for producing a current flow through the transistor to vary the charge on the capacitor means in accordance with the amplitude of the input signal during increases in the amplitude of the input signal and to cooperate with the capacitor in producing a bias on the emitter of the transistor relative to the base of the transistor for decreasing the flow of current through the transistor upon a decrease in the amplitude of the input signal; a voltage source; a transformer having first, second and third windings; the first transformer winding being included in a circuit with the collector and the voltage source to produce a pulse at the instant of a decrease in the flow of current through the transistor; an asymmetrically conductive device connected in shunt with the first transformer winding effectively to short circuit the first transformer winding upon the flow of current through the transistor during increases in the amplitude of the input signal; the second winding being interposed electrically between the input circuit and the base of the transistor and being magnetically coupled to the first winding to interrupt the flow of current through the transistor upon the production of the pulse in the first winding so as to facilitate the production of the pulse in the first winding; and the third winding being operative to produce the output pulse upon the production of the pulse in the first winding.

6. In combination for use with a reference potential for operating upon an input signal having an amplitude progressively increasing to a positive peak value and progressively decreasing from the positive peak value to a negative peak value to produce pulses of short duration relative to the input signal and at peak amplitudes during the introduction of the input signal: a first semi-conductor constructed to pass current of a first polarity; a second semi-conductor constructed to pass current of a second polarity opposite to the first polarity; capacitor means connected to said first and second semi-conductors to receive a charge of one polarity upon a flow of current through the first semi-conductor and to receive a charge of an opposite polarity upon a flow of current through the second semi-conductor; input circuit means connected to the semi-conductors and responsive to the input signal for producing a current flow through the first semi-conductor during amplitude increases of the input signal toward the positive peak and for producing a current flow through the second semi-conductor during amplitude increases of the input signal toward the negative peak to vary the charge on the capacitor means in accordance with the amplitude of the input signal for an instantaneous decrease in the current flow through the first transistor at the instant of a decrease in the amplitude of the input signal from the positive peak and for an instantaneous decrease in the current flow through the second transistor at the instant of a decrease in the amplitude of the input signal from the negative peak; and means coupled to the semi-conductors for producing the output pulse at the instant of each decrease in the flow of current through one of the semi-conductors.

7. In combination for use with a reference potential for operating upon an input signal having an amplitude progressively increasing to a positive peak value and progressively decreasing from the positive peak value to a negative peak value to produce pulses of short duration relative to the input signal and at peak amplitudes during the introduction of the input signal: a first transistor having a collector electrode, a base electrode and an emitter electrode and constructed to pass current of a first polarity; a second transistor having a collector electrode, a base electrode and an emitter electrode and constructed to pass current of a second polarity opposite to the first polarity; capacitor means connected to the emitter electrodes of the first and second transistors and to the reference potential; input circuit means connected to the base electrodes of the first and second transistors and to the reference potential and responsive to the input signal for producing a current flow through the first transistor during amplitude increases of the input signal toward the positive peak and for producing a current flow through the second transistor during amplitude increases of the input signal toward the negative peak to vary the charge on the capacitor in accordance with the amplitude of the input signal for an instantaneous decrease in the flow of current through the first transistor at the instant of a decrease in the amplitude of the input signal from the positive peak and for an instantaneous decrease in the flow of current through the second transistor at the instant of a decrease in the amplitude of the input signal from the negative peak; and magnetic means coupled to the collector electrodes of the first and second transistors for producing the output pulse at the instant of each decrease in the flow of current through one of the transistors.

8. In combination for use with a reference potential for operating upon an output signal having an amplitude progressively increasing to a positive peak value and progressively decreasing from the positive peak value to a negative peak value to produce pulses of short duration relative to the input signal and at peak amplitudes during the introduction of the input signal: a first transistor having a collector electrode, a base electrode and an emitter electrode and constructed to pass current of a first polarity; a second transistor having a collector electrode, a base electrode and an emitter electrode and constructed to pass current of a second polarity opposite to the first polarity; capacitor means connected between the emitter electrodes of the first and second transistors and the reference potential; input circuit means connected to the base electrodes of said first and second transistors and to the reference potential and responsive to the input signal for producing a current flow through the first transistor during amplitude increases of the input signal toward the positive peak and for producing a current flow through the second transistor during amplitude increases of the input signal toward the negative peak to vary the charge on the capacitor in accordance with the amplitude of the input signal and to produce an instantaneous decrease in the flow of current through the first transistor at the instant of decreases in the amplitude of the input signal from the positive peak and to produce an instantaneous decrease in the flow of current through the second transistor at the instant of decreases in the amplitude of the input signal from the negative peak; a first transformer having a primary winding connected to the collector of the first transistor to produce a pulse upon a decrease in the flow of current through the first transistor and having a secondary winding interposed electrically between the input circuit means and the base of the first transistor and coupled magnetically to the first winding to interrupt the flow of current through the first transistor at the instant of the production of the pulse in the first winding; a second transformer having a primary winding connected to the collector of the second transistor to produce a pulse upon a decrease in the flow of current through the second transistor and having a secondary winding interposed between said input circuit means and the base of the second transistor and coupled magnetically to the first winding of the second transformer to interrupt the flow of current through the second transistor at the instant of the production of the pulse in the first winding of the second transformer; each of the first and second transformers including a third winding for producing the output pulses at the instant of the interruptions in the flow of current through the respective ones of the first and second transistors.

9. The combination defined in claim 8 in which a voltage source is provided with first and second terminals and is constructed to introduce voltage of one polarity to the first terminal and is constructed to introduce to the second terminal voltage of a second polarity opposite to the first polarity and in which the primary winding of the first transformer is connected in a circuit between the collector of the first transistor and the first terminal of the voltage source and in which the primary winding of the second transformer is connected in a circuit between the collector of the second transistor and the second terminal of the voltage source.

10. In combination for operating upon an input signal having amplitude characteristics variable between positive and negative amplitude peaks to produce clock pulses recurring periodically and coincident with the positive and negative peaks in the input signal, means responsive to the input signal for producing first pulses upon the occurrence of the positive amplitude peaks in the input signal and for producing second pulses upon the occurrence of the negative amplitude peaks in the input signal, means responsive to the first pulses for delaying the first pulses by a first particular time, means responsive to the second pulses for delaying the second pulses by a second particular time different from the first particular time, and means responsive to the delayed first and second pulses for combining the delayed first and second pulses to produce the clock pulses.

11. In the combination set forth in claim 10, means responsive to the clock pulses and the input signal for producing first output signals representing first information upon the occurrence of a first polarity in the input signal at the time of occurrence of the clock pulses and for producing second output signals representing second information upon a lack of occurrence of the first polarity in the input signal at the time of occurrence of the clock pulses.

12. In combination for operating upon an input signal having amplitude characteristics variable between positive and negative amplitude peaks to produce clock pulses recurring periodically and coincident with the positive and negative peaks in the input signal, a peak detector including first and second transistors responsive to the input signal and including a capacitor coupled electrically to the first and second transistors to receive a charge variable in accordance with the characteristics of the input signal for an instantaneous decrease in the flow of current through the first transistor at the instant of a decrease in the amplitude of the input signal from the positive peak and for an instantaneous decrease in the flow of current through the second transistor upon a decrease in the amplitude of the input signal from the negative peak and including means coupled to the first transistor for producing first pulses at the instant of a decrease in the flow of current through the first transistor and including means coupled to the second transistor for producing second pulses at the instant of a decrease in the flow of current through the second transistor; means responsive to the first and second pulses for delaying the first pulses by first particular time intervals to produce first resultant pulses and for delaying the second pulses by second particular time intervals different from the first particular time intervals to produce second resultant pulses; and means responsive to the first and second resultant pulses for combining the pulses to produce the clock pulses at the times of occurrence of the resultant pulses.

13. In combination for operating upon an input signal having amplitude characteristics variable between positive and negative amplitude peaks to produce clock pulses recurring periodically and coincident with the positive and negative peaks in the input signal, a peak detector including first and second transistors each having an input electrode, a common electrode and an output electrode, the first transistor being constructed to pass current in a first direction and the second transistor being constructed to pass current in a second direction opposite to the first direction, means coupled electrically to the input electrodes of the transistors for introducing the input signal to the input electrodes to produce a flow of current through the first transistor during increases in the amplitude of the input signal toward the positive peak and to produce a flow of current through the second transistor during increases in the amplitude of the input signal toward the negative peak, a capacitor coupled electrically to the common electrodes of the transistors to receive a charge in accordance with the amplitude of the input signal and in accordance with the flow of current through the first and second transistors for an instantaneous decrease in the flow of current through the first transistor at the instant of a decrease in the amplitude of the input signal from the positive peak and for an instantaneous decrease in the flow of current through the second transistor at the instant of a decrease in the amplitude of the input signal from the negative peak, means including first inductive means coupled to the output electrode of the first transistor and responsive to each decrease in the flow of current through the first transistor for producing a first output pulse at the instant of each decrease in the flow of current through the first transistor, means including second inductive means coupled to the output electrode of the second transistor and responsive to each decrease in the flow of current through the second transistor for producing a second output pulse at the instant of each decrease in the flow of current through the second transistor; first delay means responsive to the first pulses for delaying the pulses by a first particular time interval to produce first resultant pulses; second delay means responsive to the second pulses for delaying the pulses by a second particular time interval different from the first time interval to produce second resultant pulses; and means responsive to the first and second resultant pulses for combining the pulses to produce the clock pulses.

References Cited in the file of this patent

UNITED STATES PATENTS

| | | |
|---|---|---|
| 2,758,206 | Hamilton | Aug. 7, 1956 |
| 2,777,092 | Mandelkorn | Jan. 8, 1957 |
| 2,816,230 | Lindsay | Dec. 10, 1957 |
| 2,843,743 | Hamilton | July 15, 1958 |
| 2,870,310 | Overbeek | Jan. 20, 1959 |
| 2,872,596 | Day et al. | Feb. 3, 1959 |
| 2,905,835 | Wray | Sept. 22, 1959 |
| 2,906,893 | Mattson | Sept. 29, 1959 |